Patented Dec. 11, 1951

2,578,325

UNITED STATES PATENT OFFICE 2,578,325

OXYFLUORIDE GLASSES

Kuan-Han Sun, Pittsburgh, Pa., and Maurice L. Huggins, Rochester, N. Y., assignors to Eastman Kodak Company, Rochester, N. Y., a corporation of New Jersey Application December 13, 1949, Serial No. 132,693

6 Claims. (Cl. 106—47)

The present invention relates to glasses, and specifically to glasses which may be classified as oxy-fluoride glasses. This application is a continuation-in-part of our application, Serial No. 568,314, filed December 15, 1944, now Patent No. 2,511,224, granted June 13, 1950, which relates generically to glasses either consisting entirely of fluorides or containing predominantly fluoride with small amounts of other electronegative elements such as oxygen, and specifically to different pure fluoride glasses. The present application is specific to oxy-fluoride glasses.

This application is to be distinguished from patents, Sun 2,430,539, granted November 11, 1947, and Sun and Huggins 2,481,700, granted September 13, 1949, both relating to fluophosphate glasses, and from patents, Sun 2,456,033, granted December 14, 1948, and Sun 2,466,505, granted April 5, 1949, both relating to fluoborate glasses, and from Sun 2,425,403, granted August 12, 1947, relating to fluogermanate glasses, and from Sun 2,481,701, granted September 13, 1949, relating to fluosilicate glasses. These patents, the applications for which were filed after the patent application 568,314, relate principally to glasses which are primarily oxide glasses, the ionic percentage of fluorine being in most cases much less than in the present case. Several of these also have a much higher percentage of alkali-metal fluoride than the present glasses, which have little or no alkali metal.

In general, fluorides have very low optical dispersions and high Abbe values. While glasses made solely of fluorides have the greatest Abbe values, it has been found that a certain proportion of compounds known and frequently used in glass compositions are compatible with the fluorides and, if introduced in minor amounts, tend to increase the stability of the glass and its resistance to weathering. They do, however, reduce the Abbe value, but this is still in an area different from and above those of previously known oxide glasses. The same generalization is true of the effect of the addition of oxides upon the partial dispersion ratios in that these are closer than those of the pure fluoride glasses to those of previously known commercial glasses. By the addition of oxides in limited amounts to the fluoride glasses given in any of the examples in said prior application, it is possible to obtain glasses having properties intermediate to those of pure fluoride glasses and known commercial glasses. The glass maker is thus enabled to produce glasses having a wide variety of properties suitable for combination with other glasses in the design of objectives and other optical systems.

Figure 1:
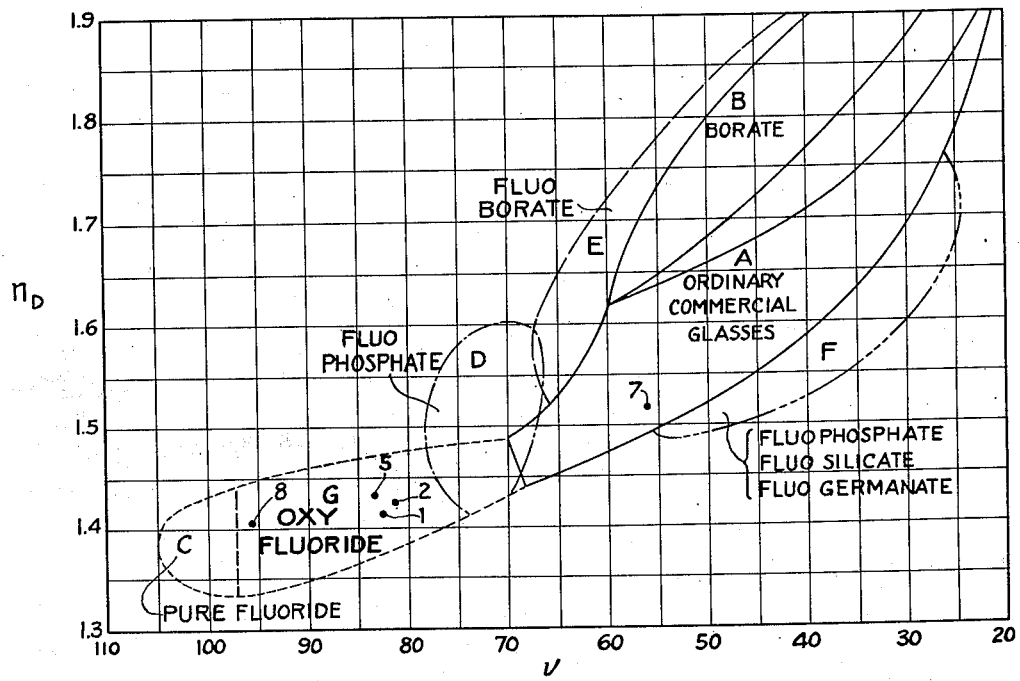
Figure 2:
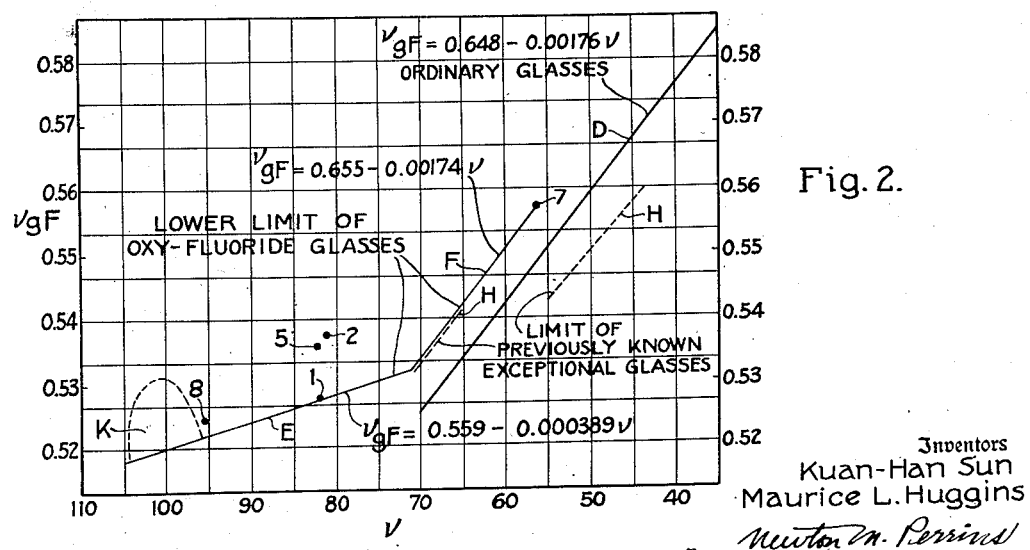

Reference will be made to the accompanying drawings in the form of diagrams or charts used to illustrate and explain the novel and desirable properties of our new oxy-fluoride glasses. Fig. 1 is a chart, the coordinates of which are $n_D$, the refractive index, and $\nu$, the Abbe value, showing the areas of these values, both for previously known and our present glasses. Fig. 2 is a chart, the coordinates of which are $\nu_{gF}$, the partial dispersion ratio for $g$ and $F$, and $\nu$, the Abbe value, illustrating the relation between these values.

There are certain relationships between the optical constants of a glass that are especially important to optical designers. The first of these is the relationship between the $n_D$ and $\nu$ values. $n_D$ is the refractive index for the sodium D-line, and $\nu$ is defined as $$\frac{n_D - 1}{n_F - n_C}$$

where $n_F$ and $n_C$ are the refractive indices for the F- and C-lines, respectively.

In Fig. 1, $n_D$ is plotted against $\nu$. Optical designers would like to have glasses with properties represented by points scattered all over the chart so that they might choose two or more glasses, for use together, having any desired combination of optical properties. In practice, however, the availability of glasses with respect to their $n_D$ and $\nu$ values, is rather limited.

In Fig. 1, the area A, "Ordinary Commercial Glasses," includes, we believe, all glasses used in optical designs up to about 1939. The introduction of borate glasses, particularly those also containing rare elements, described by G. W. Morey in U. S. Reissue Patent No. 21,175, greatly extended the area of available glasses, as shown approximately in the area B in the chart designated "Borate Glasses." Area C, "Pure Fluoride Glasses," includes the approximate region covered by those glasses consisting entirely of fluorides which are described in application No. 568,314. Area D includes the approximate region for those fluophosphate glasses covered by Patent No. 2,481,700; Area E indicates the approximate region for the fluoborate glasses covered by Patent 2,456,033, and area F includes the regions of the fluophosphate glasses of 2,430,539 and also of fluosilicate and fluogermanate glasses. These areas overlap and are not separately designated.

The points designated 1, 2, 5, 7, and 8 indicate the values for the similarly designated examples given hereafter. It is to be noted that these include a region G extending from the region C of the pure fluoride glasses into that A, of ordinary commercial glasses and also overlap region D, thus affording, as noted above, a wide range of values which may be obtained by varying the components, and particularly the proportion of oxygen to fluorine. It is to be understood that the various areas are approximate and overlap more or less. They are intended merely to show graphically the general fields of interest and to show that the present glasses have a range of useful properties not found in any other known glasses.

A second relationship of great importance to optical designers is that between $\nu_{gF}$ and $\nu$, $\nu_{gF}$ being the partial dispersion ratio defined as $$\frac{n_g - n_F}{n_F - n_C}$$

This measures the curvature of the dispersion curve near the blue end of the spectrum. In the examples hereinafter given, $\nu_{gF}$ is equal to or greater than $(0.655 - 0.001743\nu)$, line F in Fig. 2, for a value less than 70 and equal to or greater than $(0.559 - 0.000389\nu)$, line E of Fig. 2, for a $\nu$ value greater than 70. For ordinary glasses, $\nu_{gF}$ is about $(0.648 - 0.00176\nu)$, line D, the $\nu$ values for such known glasses lying between 35 and 70.

Referring again to Fig. 2, the line D indicates the $\nu_{gF}$ vs. $\nu$ relation for ordinary glasses according to the equation mentioned, and the line E—F indicates the lower limit of the same relation for our new glasses having a $\nu$ value, respectively, above and below 70, according to the equations mentioned. Approximate limits for exceptional previously known glasses are indicated by dotted lines H in this figure. The values for pure fluoride glasses, as disclosed in application 568,314, fall within the area K, and it is to be noted that the values for oxy-fluoride glasses, indicated by the pertinent example numbers, 1, 2, 5, 7, and 8, fall between those for such glasses and known commercial glasses, thus affording an opportunity for the manufacture and selection of glasses having intermediate optical properties of value in the design of optical systems.

The objects of the present invention are attained by making moisture-resisting glasses which contain, first, beryllium, and aluminum fluorides as the predominant glass formers; second, compatible oxygen-containing components, referred to generically as oxides, such as borates, silicates, germanates, phosphates, and sulfates, particularly those known to be glass formers; and third, water-insoluble fluorides particularly those of magnesium, calcium, strontium, barium, lead, and lanthanum, with little or, preferably, no fluorides of the alkali metals, lithium, sodium, potassium, rubidium, and cesium.

The fluorides of the divalent metals mentioned have a solubility in water less than 0.16 part by weight in 100 parts of solution at 20° C., and the other polyvalent fluorides mentioned are all insoluble or only slightly soluble in water, and by the term "insoluble" we intend to include such slight solubility.

As illustrative of our invention, consecutively numbered examples are given, assembled for convenience of comparison in four tables. All the compositions are given on the basis of anhydrous components of the batch. In each example the weight percentages are given in a column under the letter W, and the corresponding mole percentages under the letter M. In the first three tables the $n_D$ value is also given. The examples of Tables I, II, and III are given in our application 568,314 and those of Table IV, which are not specifically claimed, are added as illustrative of compositions which we consider as within the scope of our claims.

TABLE I

|  | 1 | | 2 | | 3 | |
|---|---|---|---|---|---|---|
|  | W | M | W | M | W | M |
| $MgF_2$ | 9.2 | 12.5 | 8.7 | 12.2 | 8.1 | 12.3 |
| $CaF_2$ | 11.0 | 12.0 | 10.5 | 11.7 | 9.7 | 11.7 |
| $SrF_2$ | 7.3 | 4.9 | 7.0 | 4.9 | 6.5 | 4.9 |
| $BaF_2$ | 8.2 | 4.0 | 7.9 | 3.9 | 7.3 | 4.0 |
| $PbF_2$ | 9.2 | 3.1 | 10.5 | 3.8 | 9.7 | 3.7 |
| $LaF_3$ | 8.2 | 3.6 | 7.9 | 3.5 | 7.3 | 3.5 |
| $AlF_3$ | 15.5 | 15.7 | 15.7 | 16.4 | 14.5 | 16.5 |
| $BeF_2$ | 22.9 | 41.5 | 21.6 | 40.3 | 18.3 | 36.9 |
| $Al(PO_3)_3$ | 8.5 | 2.7 | 10.0 | 3.3 | 18.2 | 6.5 |
| $n_D$ | 1.4183 | | 1.4222 | | 1.4321 | |

TABLE II

|  | 4 | | 5 | | 6 | | 7 | |
|---|---|---|---|---|---|---|---|---|
|  | W | M | W | M | W | M | W | M |
| $MgF_2$ | 10.8 | 14.6 | 8.6 | 11.9 | 6.8 | 10.5 | 5.8 | 9.7 |
| $CaF_2$ | 11.7 | 12.7 | 10.3 | 11.4 | 8.3 | 10.2 | 7.0 | 9.4 |
| $SrF_2$ | 7.2 | 4.8 | 6.9 | 4.7 | 5.5 | 4.2 | 4.7 | 3.8 |
| $BaF_2$ | 9.9 | 4.8 | 7.7 | 3.8 | 6.3 | 3.5 | 5.3 | 3.1 |
| $PbF_2$ |  |  | 8.6 | 3.0 | 8.3 | 3.3 | 7.0 | 3.0 |
| $LaF_3$ | 4.5 | 2.0 | 7.7 | 3.4 | 6.3 | 3.1 | 5.3 | 2.8 |
| $CeF_3$ | 3.6 | 1.4 |  |  |  |  |  |  |
| $ThF_4$ | 4.5 | 1.3 |  |  |  |  |  |  |
| $AlF_3$ | 18.0 | 19.0 | 14.6 | 15.0 | 12.4 | 14.3 | 10.5 | 13.0 |
| $BeF_2$ | 19.8 | 35.8 | 21.5 | 40.2 | 16.9 | 34.6 | 14.5 | 32.1 |
| $BbO$ |  |  |  |  |  |  | 24.0 | 11.3 |
| $P_2O_5$ | 6.0 | 3.6 | 8.4 | 5.1 | 17.4 | 11.8 | 16.0 | 11.8 |
| $La_2O_3$ | 4.0 | 1.0 | 5.6 | 1.5 | 11.6 | 3.5 |  |  |
| $n_D$ | 1.4140 | | 1.4267 | | 1.4673 | | 1.5140 | |

TABLE III

|  | 8 | |
|---|---|---|
|  | W | M |
| $MgF_2$ | 10.8 | 14.1 |
| $CaF_2$ | 11.7 | 12.3 |
| $SrF_2$ | 7.2 | 4.7 |
| $BaF_2$ | 9.9 | 4.6 |
| $LaF_3$ | 4.5 | 2.0 |
| $CeF_3$ | 3.6 | 1.4 |
| $ThF_4$ | 4.5 | 1.2 |
| $AlF_3$ | 18.0 | 17.5 |
| $BeF_2$ | 19.8 | 34.5 |
| $BaSO_4$ | 10.0 | 7.7 |
| $n_D$ | 1.4021 | |

TABLE IV

|  | 9 | | 10 | | 11 | |
|---|---|---|---|---|---|---|
|  | W | M | W | M | W | M |
| $MgF_2$ | 8.9 | 12 | 9.4 | 12 | 9.1 | 12 |
| $CaF_2$ | 9.3 | 10 | 9.8 | 10 | 9.5 | 10 |
| $SrF_2$ | 7.5 | 5 | 7.9 | 5 | 7.6 | 5 |
| $BaF_2$ | 10.4 | 5 | 11.0 | 5 | 10.7 | 5 |
| $PbF_2$ | 11.6 | 4 | 3.1 | 1 | 3.0 | 1 |
| $LaF_3$ | 2.3 | 1 | 2.5 | 1 | 2.4 | 1 |
| $AlF_3$ | 15.9 | 16 | 16.9 | 16 | 16.3 | 16 |
| $BeF_2$ | 22.3 | 40 | 23.7 | 40 | 22.9 | 40 |
| $PbO$ |  |  | 11.2 | 4 | 10.9 | 4 |
| $La_2O_3$ | 7.7 | 2 |  |  |  |  |
| $B_2O_3$ | 4.1 | 5 |  |  |  |  |
| $SiO_2$ |  |  | 4.5 | 6 |  |  |
| $GeO_2$ |  |  |  |  | 7.6 | 6 |

The above examples are repeated below, the same examples being designated by the same numbers with the proportions given as percentages of ions or atoms of each element. These may be called the ionic, atomic, or elemental percentages. In using ionic formulas and the expression "ionic percentage," however, we do not wish to imply that the binding forces between adjacent atoms are necessarily purely ionic in character. The following Table V gives these ionic percentages for Examples 1, 2, 3, 5, 6, and 7. Table VI gives the percentages for Examples 4 and 8, and Table VII gives the percentages for Examples 9, 10, and 11.

TABLE V
*Ionic percentages*

|  | 1 | 2 | 3 | 5 | 6 | 7 |
|---|---|---|---|---|---|---|
| $Mg^{++}$ | 3.62 | 3.46 | 3.19 | 3.51 | 2.85 | 2.76 |
| $Ca^{++}$ | 3.46 | 3.34 | 3.05 | 3.36 | 2.78 | 2.66 |
| $Sr^{++}$ | 1.43 | 1.38 | 1.27 | 1.40 | 1.15 | 1.11 |
| $Ba^{++}$ | 1.14 | 1.12 | 1.02 | 1.11 | 0.94 | 0.89 |
| $Pb^{++}$ | 0.92 | 1.06 | 0.97 | 0.89 | 0.88 | 4.03 |
| $La^{+++}$ | 1.02 | 1.00 | 0.92 | 1.87 | 2.70 | 0.80 |
| $Al^{+++}$ | 5.32 | 5.58 | 5.94 | 4.41 | 3.86 | 3.70 |
| $Be^{++}$ | 11.94 | 11.39 | 9.58 | 11.62 | 9.40 | 9.14 |
| $P^{+++++}$ | 2.38 | 2.82 | 5.09 | 3.01 | 6.44 | 6.68 |
| $O^{--}$ | 7.13 | 8.46 | 15.27 | 8.83 | 18.90 | 19.88 |
| $F^-$ | 61.65 | 60.40 | 53.68 | 60.00 | 50.10 | 48.34 |

TABLE VI
*Ionic percentages*

|  | 4 | 8 |
|---|---|---|
| $Mg^{++}$ | 4.29 | 4.40 |
| $Ca^{++}$ | 3.71 | 3.81 |
| $Sr^{++}$ | 1.42 | 1.46 |
| $Ba^{++}$ | 1.40 | 2.53 |
| $La^{+++}$ | 1.18 | 0.58 |
| $Ce^{+++}$ | 0.41 | 0.42 |
| $Th^{++++}$ | 0.36 | 0.37 |
| $Al^{+++}$ | 5.31 | 5.45 |
| $Be^{++}$ | 10.43 | 10.70 |
| $P^{+++++}$ | 2.10 | ------ |
| $S^{++++++}$ | ------ | 1.08 |
| $O^{--}$ | 6.15 | 4.33 |
| $F^-$ | 63.24 | 64.87 |

TABLE VII
*Ionic percentages*

|  | 9 | 10 | 11 |
|---|---|---|---|
| $Mg^{++}$ | 3.63 | 3.82 | 3.82 |
| $Ca^{++}$ | 3.02 | 3.20 | 3.20 |
| $Sr^{++}$ | 1.51 | 1.60 | 1.60 |
| $Ba^{++}$ | 1.51 | 1.60 | 1.60 |
| $Pb^{++}$ | 1.21 | 1.60 | 1.60 |
| $La^{+++}$ | 1.51 | 0.31 | 0.31 |
| $Al^{+++}$ | 4.84 | 5.10 | 5.10 |
| $Be^{++}$ | 12.10 | 12.80 | 12.80 |
| $B^{+++}$ | 3.02 | ------ | ------ |
| $Si^{++++}$ | ------ | 1.92 | ------ |
| $Ge^{++++}$ | ------ | ------ | 1.92 |
| $O^{--}$ | 6.35 | 5.11 | 5.11 |
| $F^-$ | 61.30 | 63.00 | 63.00 |

In general, although a glass may be formed from a batch containing various components, these individual components do not exist as such in the final product. It is more nearly correct to consider a glass as an irregular aggregate of positive and negative ions or atoms ($Be^{++}$, $Al^{+++}$, $P^{+++++}$, $F^-$, $O^{--}$, etc.), although the forces between adjacent atoms, especially between adjacent silicon, phosphorus, or sulfur atoms and oxygen atoms, are by no means purely ionic in character. For this reason, the "ionic percentages" or "atomic percentages" used in Tables V, VI, and VII are more significant than the weight and mole percentages used in Tables I, II, III, and IV.

In expressing the compositions in terms of simple fluorides and oxides, we do not imply that these simple compounds are necessarily originally used in the actual batches. Complex fluorides, oxides, fluoroxides, mixed oxides, etc., (including those such as ammonium beryllium fluoride which decompose on heating to give, besides the desired components, other compounds which are removed by volatilization) may be used in such proportions as to give the desired final compositions. Wholly volatile fluorides such as ammonium fluoride, ammonium hydrogen fluoride, etc., may be added for other advantageous effects without materially affecting the final composition.

Moreover, in a glass consisting of a number of components the same final composition can be arrived at in various ways by using different combinations of the same or different compounds in the batch. We do not wish to restrict our claims to any particular combination of compounds used in the batch. For instance, Examples 1, 2, and 3 were made using aluminum metaphosphate in addition to various metallic fluorides. Identical glasses might have been made, however, using appropriate amounts of phosphates of other elements (beryllium, magnesium, calcium, strontium, barium, lead, lanthanum, cerium, and thorium) introducing aluminum as aluminum fluoride. One might also produce these glasses, introducing no phosphate, as such, in the batch, but instead the oxides of phosphorus and of a metal, as in Examples 4 to 7, inclusive, or any of the metals whose fluorides are mentioned, or appropriate amounts of fluoride or oxyfluoride of pentavalent phosphorus with oxides of some of the other elements which will be in the glass product.

Furthermore, instead of introducing oxides such as $La_2O_3$ together with fluorides of the other metals mentioned, as in Example 9, the lanthanum may be introduced entirely as a fluoride with the oxides of one or more of the other metals. The ultimate composition of the resulting glass would be the same. The composition is not, therefore, limited to the use of any specific oxide or oxides. In such cases as these the advantage of expressing compositions in terms of relative amounts of ions or atoms is obvious. The general principle is also applied to other cases where simple or compound oxides, such as borates, silicates, germanates, sulfates, etc., are introduced.

Although we definitely prefer not to use alkali metal or other soluble fluorides, it is possible to make glasses which resist attack by moisture fairly well from batches containing some fluoride of an alkali metal. It is not necessary to introduce all batch components at one time. In those glasses containing cerium this is in the cerous state, since cerous fluoride is said to be produced from ceric fluoride by heating the latter to a dull red heat. The glasses listed are all transparent in that they are clear and transmit light without objectionable diffusion, even though some wavelengths may be absorbed. The presence of cerium, praseodymium, and neodymium materially reduces the transmission in the invisible portions of the spectrum.

In Table VIII are listed certain optical data of the glasses given in Examples 1, 2, 5, 7, and 8:

TABLE VIII
*Optical properties*

|  | 1 | 2 | 5 | 7 | 8 |
|---|---|---|---|---|---|
| $n_D$ | 1.4183 | 1.4222 | 1.4267 | 1.5140 | 1.4021 |
| $\nu$ | 82.0 | 81.0 | 82.3 | 56.0 | 95.3 |
| $n_F - n_C$ | 0.00512 | 0.00521 | 0.00519 | 0.00920 | 0.00422 |
| $n_F - n_D$ | .00359 | .00365 | .00363 | .00651 | .00296 |
| $n_e - n_C$ | .00281 | .00284 | .00284 | .00497 | ------ |
| $n_g - n_F$ | .00270 | .00280 | .00278 | .00512 | .00221 |
| $n_h - n_g$ | ------ | .00233 | .00230 | ------ | ------ |
| $\nu_{gF}$ | 0.527 | 0.537 | 0.536 | 0.557 | 0.524 |

It is to be noted that the presence of oxygen ions increases the index of refraction and decreases the Abbe value. In general, the fluorides are compatible with those oxides customarily used in glass batches, and particularly with the oxides of those metals the fluorides of which are herein specified, and the combinations of the two yield useful glasses. These must be distinguished from many hitherto known commercial glasses in the manufacture of which relatively small amounts of fluorides are added but from which the fluorine is largely or completely volatilized during melting at the high temperatures at which such glasses are made. It will be seen that the presence of the fluorides predominantly in glasses containing other known glassifiers with which they are compatible adds to the utility of the glasses of the types made with such other glassifiers.

In the examples given it is to be noted that the fluorides of the five bivalent elements, magnesium, calcium, strontium, barium, and lead, particularly the first four, are present in varying proportions, totalling between 28 and 45 per cent by weight, and, with lanthanum fluoride, totalling between 35 and 54 per cent. Cerium and thorium fluorides are desirable additions up to 5 per cent. It is to be noted that the given mole percentage of the fluoride of a heavy element such as lead or thorium corresponds to a considerably larger weight per cent when the other elements present are relatively light. The mole and ionic percentages are more useful than weight percentages as definitions of the glass structure. The precise limits of the quantities of the various fluorides that may be usefully employed cannot be stated in general terms. The quantities are dependent largely on such factors as the number, amount, and proportions of ingredients, the thermal history during melting and cooling, the size of the melt and of the mold, and the like.

In the examples given, the ionic percentage of fluorine is between 45 and 65 and that of oxygen between 4 and 20, and the sum of the ionic percentages of fluorine and oxygen is approximately 68 to 70, but it may vary between 64 and 72. The highest ionic percentage of oxygen in these glasses is about 20 per cent of the whole or 40 per cent of the fluorine ions in the same batch. It is further to be noted that in the examples the amount of beryllium fluoride lies between 14 and 23 per cent by weight or 32 and 42 mole per cent, and of aluminum fluoride, 10 to 20 per cent by weight or 13 to 19 mole per cent, and the total of beryllium and aluminum fluorides between 25 and 41 per cent by weight, or 45 and 58 mole per cent. The total of those fluorides of magnesium, calcium, strontium, barium, lead, and lanthanum that are present is between 35 and 55 per cent of the total by weight, or between 30 and 45 mole per cent; and the total of the compounds containing oxygen is between 8 and 40 per cent by weight and 2 and 25 mole per cent. The ionic percentage of the six metals specifically mentioned totals between 10 and 15; of beryllium, between 9 and 12; of aluminum, between 3 and 6; and of beryllium and aluminum together, between 12 and 18.

Generally speaking, good glasses are not obtained unless at least moderately strong interatomic bonds such as those between beryllium and fluorine form an irregular three-dimensional network. For this the ratios of the number of fluorine atoms to the number of atoms of other elements such as beryllium or aluminum which form strong bonds to fluorine must not be too large. Since a fluoride of a trivalent or tetravalent element furnishes three or four fluorine atoms for every atom of the trivalent or tetravalent element, large relative proportions in moles of such elements cannot be introduced. On the other hand, even moderate proportions of fluorides of monovalent elements make a glass which is relatively soluble in water and so unstable to attack by atmospheric moisture. We therefore limit the amount of such fluorides to not over 10 per cent by weight or 10 mole per cent, and the ionic per cent of the alkali metal being less than 5. The presence of such fluorides also tends to increase the mobility of the ions in a glass and so facilitates devitrification. For these reasons most of the satisfactory glasses which we have made contain primarily bivalent, trivalent, and tetravalent elements, with the molal proportions of the last two relatively small. Fluorides of the heavy elements are sometimes especially useful components, because they tend to give a glass of high refractive index.

As noted above, the proportions given are by way of example. The structure of a glass is extremely complex, and this is of course increasingly so the greater the number of ingredients, making it practically impossible to obtain equilibrium diagrams showing the same limits of the amounts of fluorides that may be present in the numerous possible combinations. In general, the presence of a considerable number of different compounds is preferable to the use of a few, since this reduces the tendency to crystallization or phase separation.

Having thus described our invention, what we claim is:

1. An oxy-fluoride glass consisting of the heat reaction product of a batch in which the following elements are present in the following ionic percentages: fluorine, 48 to 65; oxygen, 4 to 20; the total of fluorine and oxygen being between 64 and 72; sulphur, 1 to 3; beryllium, 9 to 12; aluminum, 3 to 6; and the following metals magnesium, 2.76 to 4.40; calcium, 2.66 to 3.81; strontium, 1.11 to 1.60; barium, .89 to 2.50; lead, .92 to 4.03; and lanthanum, .31 to 2.70.

2. Oxy-fluoride glass consisting of metal fluorides and metal oxides and being the heat reaction product of a batch containing in ionic percentages: fluorine, from 45 to 65; oxygen, 4 to 20; fluorine and oxygen together totaling from 64 to 72; beryllium, 9 to 12; aluminum, 3 to 6; magnesium, 2.76 to 4.40; calcium, 2.66 to 3.81; strontium, 1.11 to 1.60; barium, .89 to 2.50; lead, up to 4.03; lanthanum, .31 to 2.70; and phosphorus, up to 6.68 ionic per cent.

3. Oxy-fluoride glass consisting of metal fluorides and metal oxides and being the heat reaction product of a batch containing in ionic percentages: fluorine, 45 to 65; oxygen, 4 to 20; fluorine and oxygen together totaling from 64 to 72; beryllium, 9 to 12; aluminum, 3 to 6; magnesium, 2.76 to 4.40; calcium, 2.66 to 3.81; strontium, 1.11 to 1.60; barium, .89 to 2.50; lead, up to 4.08; lanthanum, .31 to 2.70; and phosphorus, up to 6.68 ionic per cent; the total of magnesium, calcium, strontium, barium, lead, and lanthanum being from 10 to 15 ionic per cent.

4. Oxy-fluoride glass consisting of metal fluorides and metal oxides and being the heat reaction product of a batch of which by weight fluorides constitute 60 to 92 per cent, and oxides, 8 to 40 per cent; beryllium fluorides, 14 to 23 per cent by weight; aluminum fluoride, 10 to 20; the total of the said two fluorides being 25 to 41; magnesium fluoride, 5.8 to 10.8; calcium fluoride, 7.0 to 11.7; strontium fluoride, 4.7 to 7.3; barium fluoride, 5.3 to 9.9; lead fluoride, up to 10.5; lanthanum fluoride, 4.5 to 8.2; phosphorus pentoxide, up to 16; and lanthanum oxide, up to 11.6 per cent.

5. Oxy-fluoride glass consisting of metal fluorides and metal oxides and being the heat reaction product of a batch of which by weight fluorides constitute 60 to 92 per cent, and oxides, 8 to 40 per cent; beryllium fluorides, 14 to 23 per cent by weight; aluminum fluoride, 10 to 20; the total of the said two fluorides being 25 to 41; magnesium fluoride, 5.8 to 10.8; calcium fluoride, 7.0 to 11.7; strontium fluoride, 4.7 to 7.3; barium fluoride, 5.3 to 9.9; lead fluoride, up to 10.5; lanthanum fluoride, 4.5 to 8.2; phosphorus pentoxide, up to 16; and lanthanum oxide, up to 11.6 per cent; the total of the fluorides of magnesium, calcium, strontium, barium, lead, and lanthanum being from 10 to 15 per cent by weight.

6. An oxy-fluoride glass as specified in claim 1 in which the last named six metals total between 10 and 15 ionic per cent of the whole.

KUAN-HAN SUN.
MAURICE L. HUGGINS.

No references cited.